United States Patent
Ohki

(10) Patent No.: US 6,398,109 B1
(45) Date of Patent: Jun. 4, 2002

(54) ARTICLE CARRYING METHOD, PHYSICAL DISTRIBUTION SYSTEM AND CARRYING BAG USED THEREFOR

(75) Inventor: Sinji Ohki, Matsubara (JP)

(73) Assignee: LSI Card Corporation, Osaka (JP)

( * ) Notice: Subject to any disclaimer, the term of this patent is extended or adjusted under 35 U.S.C. 154(b) by 0 days.

(21) Appl. No.: 09/326,124

(22) Filed: Jun. 4, 1999

(30) Foreign Application Priority Data

Jun. 8, 1998 (JP) .......................................... 10-159447

(51) Int. Cl.⁷ .............................................. G07B 15/02
(52) U.S. Cl. ...................... 235/384; 235/375; 235/492
(58) Field of Search ............................... 235/375, 384, 235/492; 705/29

(56) References Cited

U.S. PATENT DOCUMENTS

| 3,750,167 A | 7/1973 | Gehman et al. |
| 4,211,919 A | 7/1980 | Ugon |
| 5,051,565 A | * 9/1991 | Wolfram ..................... 235/375 |
| 5,478,991 A | 12/1995 | Wantanabe et al. |
| 5,557,096 A | 9/1996 | Wantanabe et al. |

FOREIGN PATENT DOCUMENTS

| EP | 749 094 A2 | 12/1996 |
| JP | 2-296669 | 9/1982 |
| JP | 57-43808 | 12/1990 |
| JP | 4-106020 | 4/1992 |
| JP | 4-345424 | 12/1992 |
| JP | 4-354721 | 12/1992 |

* cited by examiner

Primary Examiner—Harold I. Pitts
(74) Attorney, Agent, or Firm—Darby & Darby

(57) ABSTRACT

Information about an article to be carried is written into a non-contact type IC card by a reader/writer on the side of a sending trade, and the IC card into which the information has been written is accommodated in a carrying bag to which a tag is provided and a paper-made slip is attached, and the carrying bag is stuck to the article to be carried. A conveying trade collects the article to which the carrying bag is stuck so as to convey it to a desired receiving trade. The information written into the IC card carried together with the received article is read by the reader/writer on the side of the receiving trade.

9 Claims, 4 Drawing Sheets

ARTICLE CARRYING METHOD, PHYSICAL DISTRIBUTION SYSTEM AND CARRYING BAG USED THEREFOR

BACKGROUND OF THE INVENTION

1. Field of the Invention

The present invention relates to a method of carrying articles, a physical distribution system for carrying the articles, and a carrying bag used therefor.

2. Description of the Prior Art

In an existing physical distribution system, a conveying trade generally intervenes between a sending trade and a receiving trade (ordering trade) in order to improve the conveying efficiency of the physical distribution system. The conveying trade goes to a depository of articles to be carried (generally, the sending trade) to collect the articles to be carried from the sending trade. Then, the conveying trade puts the articles which were collected from multiple sending trades in the conveying trade's center and sorts the articles according to receiving trades. Thereafter, the conveying trade conveys the articles to receiving places of the articles (generally, receiving trades) and the receiving trades receive the articles.

In such a physical distribution system, a sending trade and receiving trade are recognized by paper-made slips attached to the articles and/or tags peculiar to respective articles using bar codes or the like, for example, and the respective articles are managed by the tags peculiar to the respective articles, for example. Therefore, the slips and tags are carried together with the articles from the sending trade to the receiving trade.

In the physical distribution system, a sending trade wants to send information about an article together with the article to a receiving trade, whereas the receiving trade wants to receive the information about the article together with the article from the sending trade. If a document or the like on which such information is described is carried together with an article, the information about the article can be transmitted. However, since it is considered that a lot of information which is desired to be closed for persons other than the trades concerned is included in such information, a higher degree of secret is required for the transmission of the information.

In the existing physical distribution system where the conveying trade intervenes, in the case where a document on which information is described is transmitted, there arises a problem that the degree of the secret of the information is extremely low. Moreover, since an information medium is a document made of paper, it has a disadvantage that it is easily affected by the natural environment or the like.

BRIEF SUMMARY OF THE INVENTION

One object of the present invention is to provide an article carrying method and a physical distribution system, which are capable of sending information about an article from a carrying source (sending trade) to a carrying destination (receiving trade) while maintaining a high degree of secret at the same time when the article is carried, and a carrying bag to be used therefor.

Another object of the present invention is to provide an article carrying method and a physical distribution system capable of managing a received article at a carrying destination (receiving trade) efficiently, and a carrying bag to be used therefor.

Still another object of the present invention is to provide a carrying bag as an information media which is not much affected by the natural environment or the like.

In the present invention, the carrying source (sending trade) which accepts an order for an article writes information about the article into a non-contact type IC card. A conveying trade collects the IC card as well as the article from the carrying source (sending trade) so as to carry the collected article and the IC card to the carrying destination (receiving trade). The carrying destination (receiving trade) receives the IC card as well as the article from the conveying trade and reads the information about the article from the received IC card. Therefore, since the information about the article is transmitted by using the IC card as a medium, a secret degree of the information is high, and alternation of the information during the carrying of the article can be also prevented. Moreover, in the carrying destination (receiving trade), the information is read from the IC card carried together with the article so that all the information about the article can be managed easily.

In order to prevent an influence of an external environment, it is preferable that such an IC card is accommodated in a carrying bag, to which a slip where the carrying source (sending trade) and the carrying destination (receiving trade) has been described and a tag or the like for managing the article are attached, so as to be carried with the article.

In addition, in the case where an article is small, the article as well as the IC card is accommodated in the carrying bag so as to be capable of being carried.

Since the non-contact type IC card is used, the information may be written into the IC card before or after the IC card is accommodated in the carrying bag.

The above and further objects and features of the invention will more fully be apparent from the following detailed description with accompanying drawings.

DETAILED DESCRIPTION OF THE INVENTION

There will be detailed below embodiments of the present invention with reference to the drawings.

Figure 1:
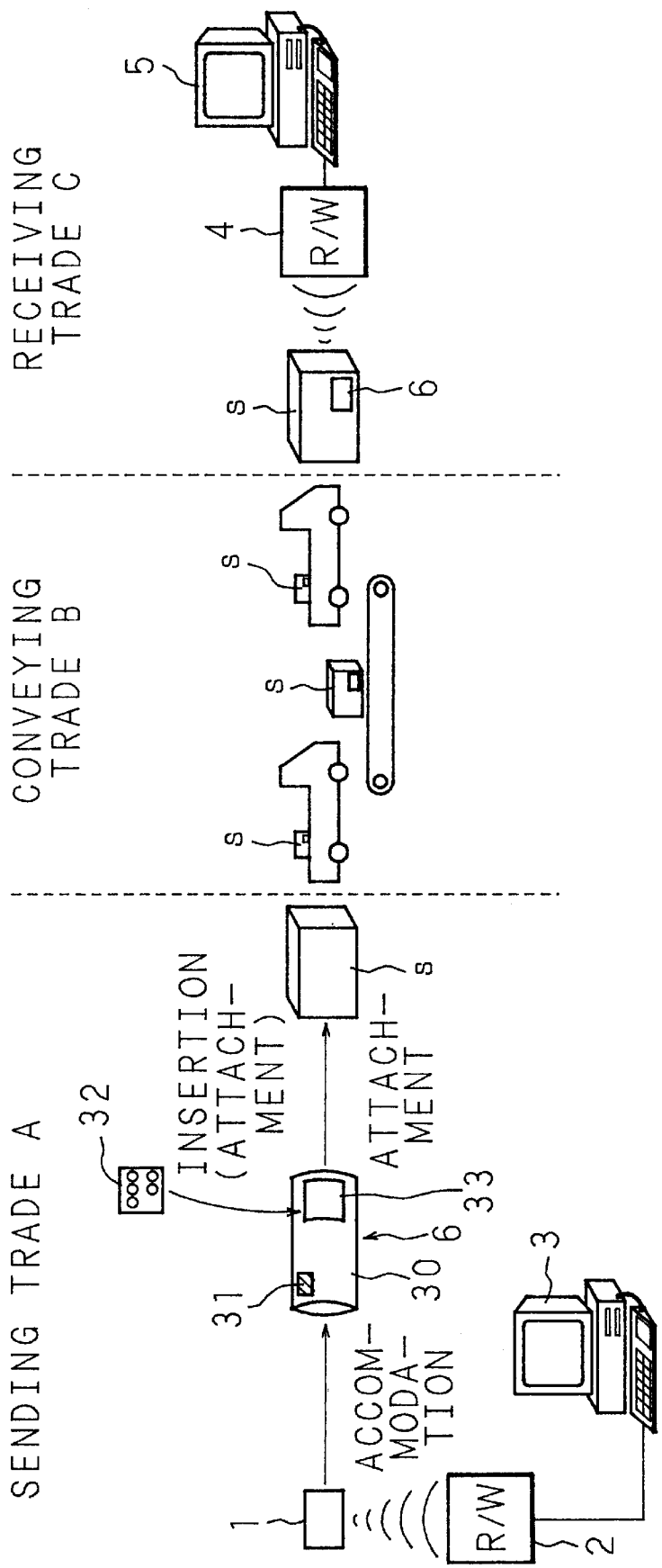
FIG. 1 is a schematic diagram showing a whole structure of a physical distribution system using an IC card according to the present invention.

FIG. 1 is a schematic diagram showing a whole structure of a physical distribution system using an IC card according to the presenting invention. In FIG. 1, A, B and C respectively show a sending trade as a carrying source which sends an article s, a conveying trade which conveys the article s, and a receiving trade as a carrying destination which receives the article s. At the sending trade A side, a reader/writer 2 for reading/writing information from/into a non-contact type IC card 1 from/into which information can be read/written without contact, and a computer 3 for controlling an operation of the reader/writer 2 and transmitting a writing signal to the reader/writer 2 are provided. Moreover, at the receiving trade C side, a reader/writer 4 for reading/writing information from/into the non-contact type IC card 1, and a computer 5 for controlling an operation of the reader/writer 4 and capturing the information read by the reader/writer 4 are provided.

Figure 2:
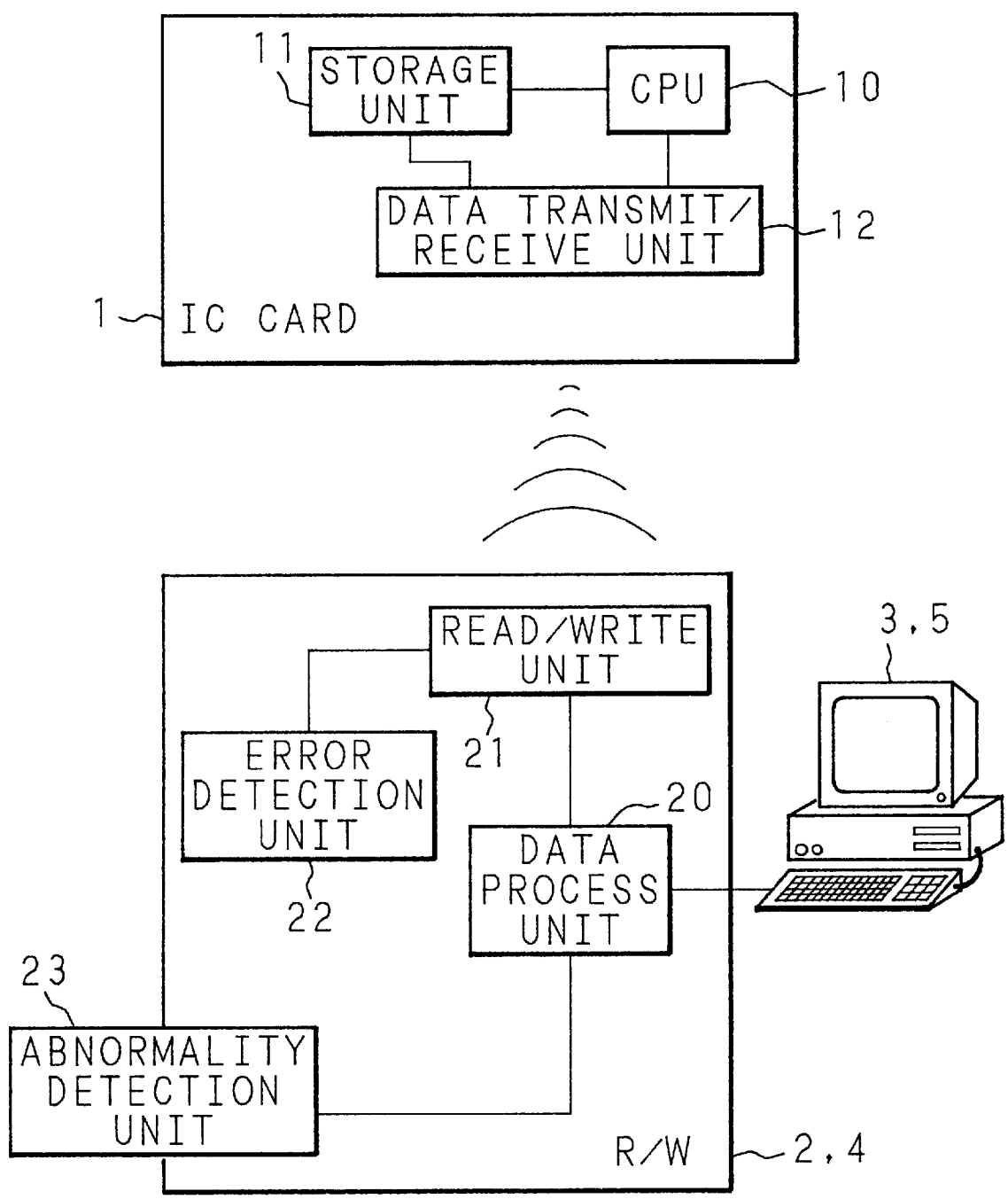
FIG. 2 is a schematic diagram showing a relationship between the IC card, a reader/writer and a computer.

FIG. 2 is a schematic diagram showing a relationship between the IC card 1, the readers/writers 2 and 4 and the computers 3 and 5. The IC card 1 has a CPU 10, a storage unit 11 for storing various data, and a data transmit/receive unit 12 for controlling data transmission/receiving with respect to the readers/writers 2 and 4.

In addition, the readers/writers 2 and 4 have a data process unit 20 including CPU, MPU and the like, a read/write unit 21 for reading/writing data from/into the IC card 1 existing within a predetermined distance without contact, an error detection unit 22 for detecting an error in the reading/writing process, and an abnormality detection unit 23 for detecting abnormality of the readers/writers 2 and 4. When the error detection unit 22 detects an error such that even if a writing instruction is given from the computers 3 and 5, data are not actually written into the IC card 1, an error or the like such that the IC card 1 is abruptly brought closer to and farther from the readers/writers 2 and 4 and thus the reading/writing process is not executed regularly, the error detection unit 22 generates an abnormality signal. Moreover, the error detection unit 22 detects also as to whether or not the IC card 1 exists within a suitable distance from the readers/writers 2 and 4. The IC card 1 prohibits an irregular reading/writing process, and the data process unit 20 controls such a protect process. When the readers/writers 2 and 4 are decomposed irregularly, the abnormality detection unit 23 detects it. When this detection function is fulfilled, program data for protecting irregular reading/writing stored in the data process unit 20 are erased.

Data can be transmitted and received between the IC card 1 and the readers/writers 2 and 4 in a non-contact state (distance: about 10 cm) by utilizing electromagnetic coupling, magnetic coupling, optical coupling, acoustic wave coupling or the like, and the data can be read/written from/into the IC card 1 by the readers/writers 2 and 4 without contact.

Figure 3:
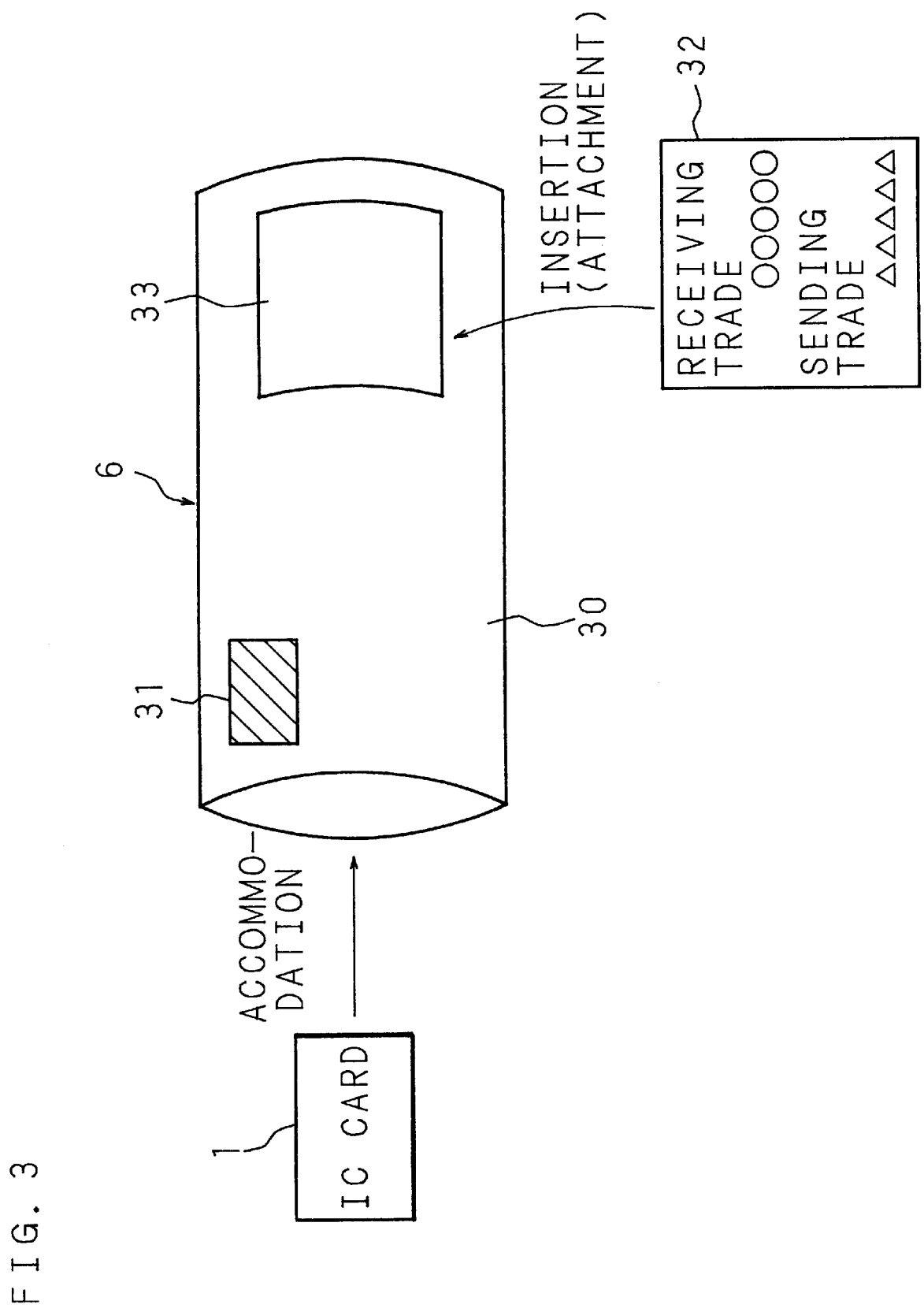
FIG. 3 is a schematic diagram of a carrying bag of the present invention.

In addition, FIG. 3 is a schematic diagram of a carrying bag 6 to be used in the physical distribution system of the present invention. This carrying bag-6 as well as the article s to be carried is carried from the sending trade A to the receiving trade C.

On a surface of a bag main body 30 of the carrying bag 6, a tag 31 on which data such as a reference number of the article s, names of the sending trade A and the receiving trade C are described is provided. The tag 31 is used when the conveying trade B mechanically sorts and manages articles s. Concrete examples of the tag 31 are such that a bar code, a cubic bar code, a color code and the like according to data are printed and the data are read optically, and that data are recorded by magnetic printing so as to be read magnetically or electro-magnetically.

In addition, on the surface of the bag main body 30 of the carrying bag 6, a display section 33 is provided, and a paper-made slip 32 on which a date, names of the sending trade A and the receiving trade C and the like are described is attached to the display section 33. Since the display section 33 has a bag shape, the slip 32 is inserted thereinto and the slip 32 may be attached to the carrying bag 6, or the slip 32 may be stuck to the display section 33 simply by an adhesive so as to be attached to the carrying bag 6. The slip 32 provided to the display section 33 is used for a personnel to visually check information about an article.

Further, the above-mentioned non-contact type IC card 1 is accommodated in the bag main body 30 of the carrying bag 6, and the carrying bag 6 which accommodates the IC card 1 is carried from the sending trade A to the receiving trade C together with the article s.

Here, as materials of the bag main body 30, various materials such as paper, vinyl, cloth, glass and metal can be used, but such a material may be selected desirably according to cost, safety and a conveying environment of the article s.

An adhesive is applied to a rear surface of the carrying bag 6 to which the tag 31 and the display section 33 are not provided so that the carrying bag 6 which accommodates the IC card 1 and is sealed can be stuck to the article s. Here, the carrying bag 6 which accommodates the IC card 1 is further put into another vinyl bag, and the vinyl bag may be stuck to the article s.

There will be described below an operation of the physical distribution system of the present invention.

The sending trade A accepts an order for the article s from the receiving trade C directly or via the conveying trade B. The sending trade A writes information about the article s (for example, an assembly diagram of the article s, quality control data of the article s, etc.) from the computer 3 into the IC card 1 by means of the reader/writer 2 without contact. The IC card 1 in which the information about the article s has been written is accommodated in the bag main body 30 of the carrying bag 6 to which the tag 31 has been already provided.

Here, in a stage that the bag main body 30 is manufactured, the tag 31 showing desired information is added, and the bag main body 30 with the tag 31 is previously prepared at the sending trade A.

In addition, the sending trade A writes the date, and the names of the sending trade A and receiving trade C into the slip 32, and the slip 32 is inserted into the bag-shaped display section 33 of the bag main body 30. Moreover, a sheet, on which these information has been written and which has been facsimiled from the receiving trade C or the conveying trade B, may be inserted into the display section 33. Here, the slip 32 or the facsimiled sheet may be stuck directly to the display section 33.

Further, the sending trade A seals the carrying bag 6, and sticks the carrying bag 6 directly or a vinyl bag accommodating it to the article s to be carried so as to complete the preparation for the sending, and asks the conveying trade B to collect the article s.

Here, in the above-mentioned example, after the writing process is performed on the IC card 1, the IC card 1 is accommodated in the bag main body 30, but since the non-contact type IC card 1 is used, after unwritten IC card 1 is accommodated in the bag main body 30, the writing process may be performed on the IC card 1 in the bag main body 30 by the reader/writer 2.

The conveying trade B collects the article s to which the carrying bag 6 has been stuck from the sending trade A so as to temporarily put the collected article s in a center of the conveying trade B. Then, information on tags 31 provided to the carrying bags 6 stuck to a lot of articles s collected in the center is read mechanically, and the articles s are sorted according to the read results. At this time, the conveying trade B can read the information on the tag 31, but cannot read information written into the IC card 1 by the sending trade A. Therefore, the secret of the recorded information in the IC card 1 can be kept. Then, the conveying trade B conveys the article s to which the carrying bag 6 has been stuck to the desired receiving trades C.

The receiving trade C receives the article s conveyed by the conveying trade B. The reading process is performed on the IC card 1 in the carrying bag 6 stuck to the article s by the reader/writer 4 without contact so that the information about the article s recorded in the IC card 1 is read and the information is captured into the computer 5. Needless to say, after the IC card 1 is taken out of the carrying bag 6, the reading process may be performed.

Here, it is not always necessary to perform the reading process on the side of the receiving trade C immediately after the article s is received, so, for example, the article s to which the carrying bag 6 is stuck is stored in a warehouse or the like, and when the article s is used, the information may be read from the IC card 1.

As for all the received articles s, relating information can be captured from the respective IC cards 1 into the computer 5, and the information about all the articles s can be one-way managed by the computer 5.

The IC card 1, from which the recorded information is read and which is not necessary for the receiving trade C, is returned from the receiving trade C to the sending trade A so as to be reused.

Here, in the above-mentioned example, the carrying bag 6 is stuck to the article s, but the present invention is not limited to such a sticking mode as long as the carrying bag 6 accommodating the IC card 1 is carried together with the article s. For example, in the case where an article s to be carried is small or a large-sized bag main body 30 is used, the article s as well as the IC card 1 into which information has been written is accommodated in the bag main body 30 so that the carrying bag 6 can be carried.

Figure 4:
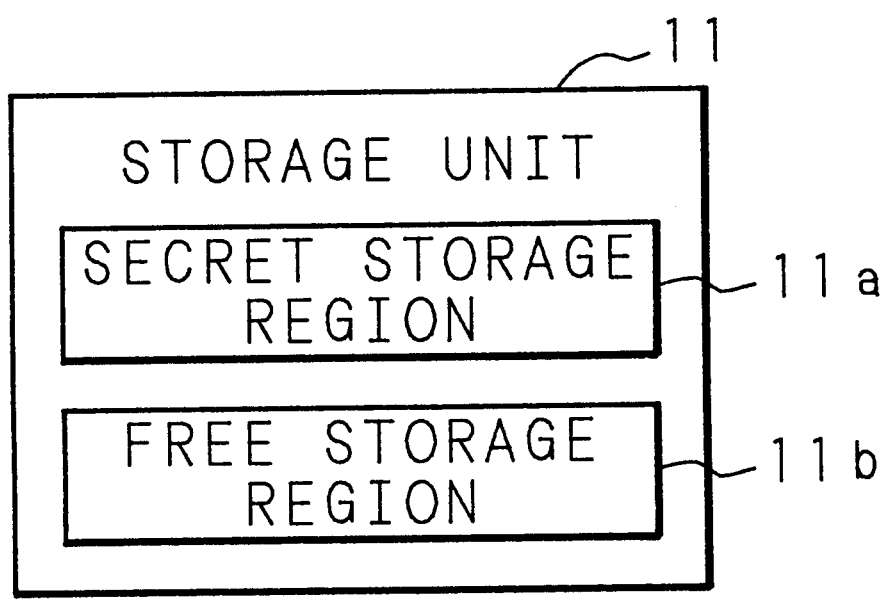
FIG. 4 is a schematic diagram showing storage regions of a storage unit of the IC card.

Incidentally, there have been demands such that the receiving trade C wants to know information such as a physical distribution situation of the article s which can be get only by the conveying trade B. In order to satisfy such demands, the conveying trade B may execute the process for writing information into the IC card 1 attached to the article s. FIG. 4 is a schematic diagram showing storage regions of the storage unit 11 of the IC card 1 in such a case. The storage unit 11 has a secret storage region 11a and a free storage region 11b. The secret storage region 11a is a region where only the sending trade A and the receiving trade C can execute the writing/reading process, and the free storage region 11b is a region where the conveying trade B as well as the sending trade A and the receiving trade C can execute the writing/reading process.

The sending trade A writes information about the article s whose secret degree is high into the secret storage region 11a of the IC card 1, and the receiving trade C reads the secret information from the secret storage region 11a. Since only the sending trade A and the receiving trade C can read the information written into the secret storage region 11a, the secret is kept.

On the contrary, the conveying trade B writes information about the physical distribution situation of the article s, the quality control of the article s in the physical distribution and the like into the free storage region 11b of the IC card 1. The receiving trade C can read the secret information from the sending trade A and also the information written by the conveying trade B.

Here, the carrying bag 6, the tag 31, the display section 33 and the like are not indispensable in the present invention, and thus it is needless to say that at least the mode, such that the IC card 1 into which the information about the article s to be carried has been written is carried together with the article s, is the basic mode of the present invention.

As mentioned above, in the present invention, since a non-contact type IC card into which information about an article has been written by a carrying source (sending trade) is carried from the carrying source (sending trade) to a carrying destination (receiving trade) together with the article, a lot of information about the article to be carried can be carried from the carrying source (sending trade) to the carrying destination (receiving trade) while the secret is being kept.

In addition, in the carrying destination (receiving trade), all the information about the article can be managed by reading the information from the IC card which has been attached to the article and carried, and thus the information can one-way controlled so that the received article can be managed efficiently.

Further, since the IC card is accommodated in a bag, to which a tag and a display section are provided, so as to be carried, it is not much affected by the natural environment such as rain and wind so that the property of IC card can be prevented from being changed and the information about the article can be transmitted from the carrying source (sending trade) to the carrying destination (receiving trade) securely.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A method of carrying an article from a carrying source to a carrying destination, comprising the steps of:

writing information about the article to be carried into a non-contact type IC card at the carrying source, wherein the IC card has a secret storage region where data can be read/written at the carrying source and carrying destination, and a free storage region where data can be read/written at a desired place; and carrying the IC card into which the information has been written to the carrying destination together with the article.

2. The article carrying method according to claim 1, further comprising the step of reading the information written into the IC card carried together with the article at the carrying destination.

3. The article carrying method according to claim 1, wherein the IC card is accommodated in a bag to which a tag and a character display section are provided, so as to be carried.

4. The article carrying method according to claim 3, wherein the article is accommodated in the bag so as to be carried.

5. The article carrying method according to claim 3, wherein after the IC card is accommodated in the bag, the information is written into the IC card.

6. The article carrying method according to claim 3, wherein after the information is written into the IC card, the IC card into which the information has been written is accommodated in the bag.

7. The physical distribution system according to claim 1, wherein the IC card into which the information about the article to be carried has been written is accommodated in a bag to which a tag and a character display section are provided, so as to be carried from the carrying source to the carrying destination.

8. A physical distribution system for carrying an article from a carrying source to a carrying destination, comprising:

a non-contact type IC card which is carried together with the article to be carried;

a writer for writing information about the article into the IC card, said writer being provided at the carrying source; and a reader for reading the information written into the IC card, said reader being provided at the carrying destination;

wherein the IC card has a secret storage region where data can be read/written at the carrying source and carrying destination, and a free storage region where data can be read/written at a desired place.

9. A carrying bag which when an article is carried is carried together with the article, comprising:

a bag main body;

a non-contact type IC card which is accommodated in said bag main body and into which information about the article to be carried is written, wherein the IC card has a secret storage region where data can be read/written at the carrying source and carrying destination, and a free storage region where data can be read/written at a desired place;

a tag provided to said bag main body; and a character display section provided to said bag main body.

* * * * *